No. 658,331. Patented Sept. 18, 1900.
H. H. HUFF.
SANDING APPARATUS FOR LOCOMOTIVES.
(Application filed June 4, 1900.)
(No Model.) 2 Sheets—Sheet 1.
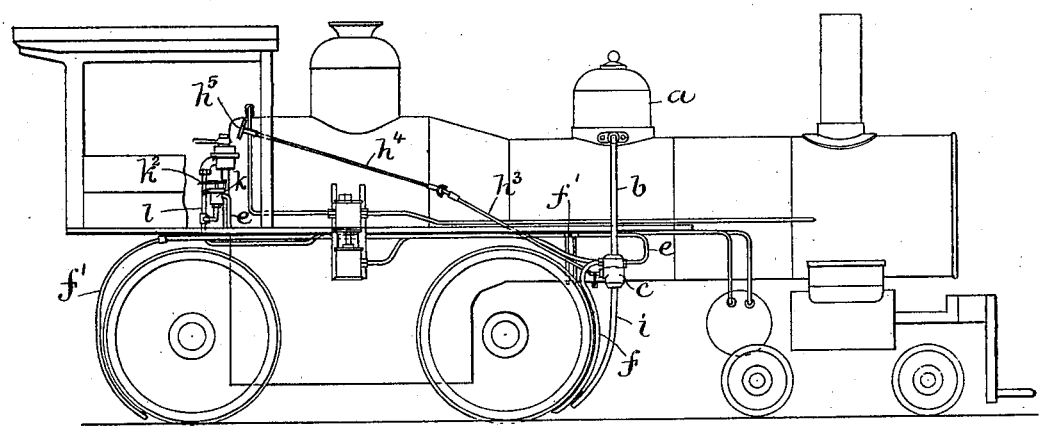
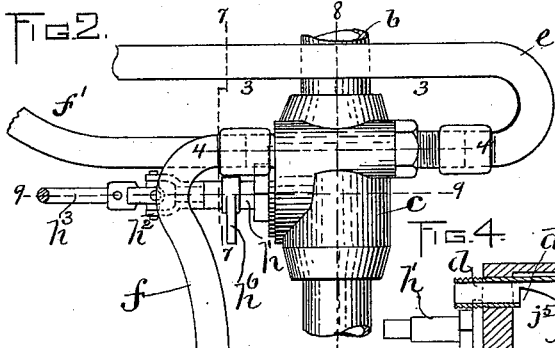
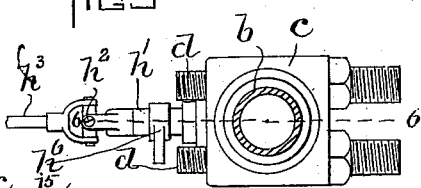
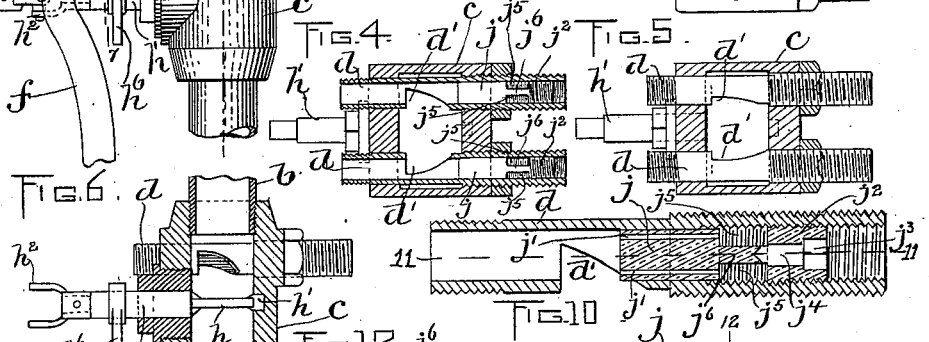
WITNESSES: INVENTOR:

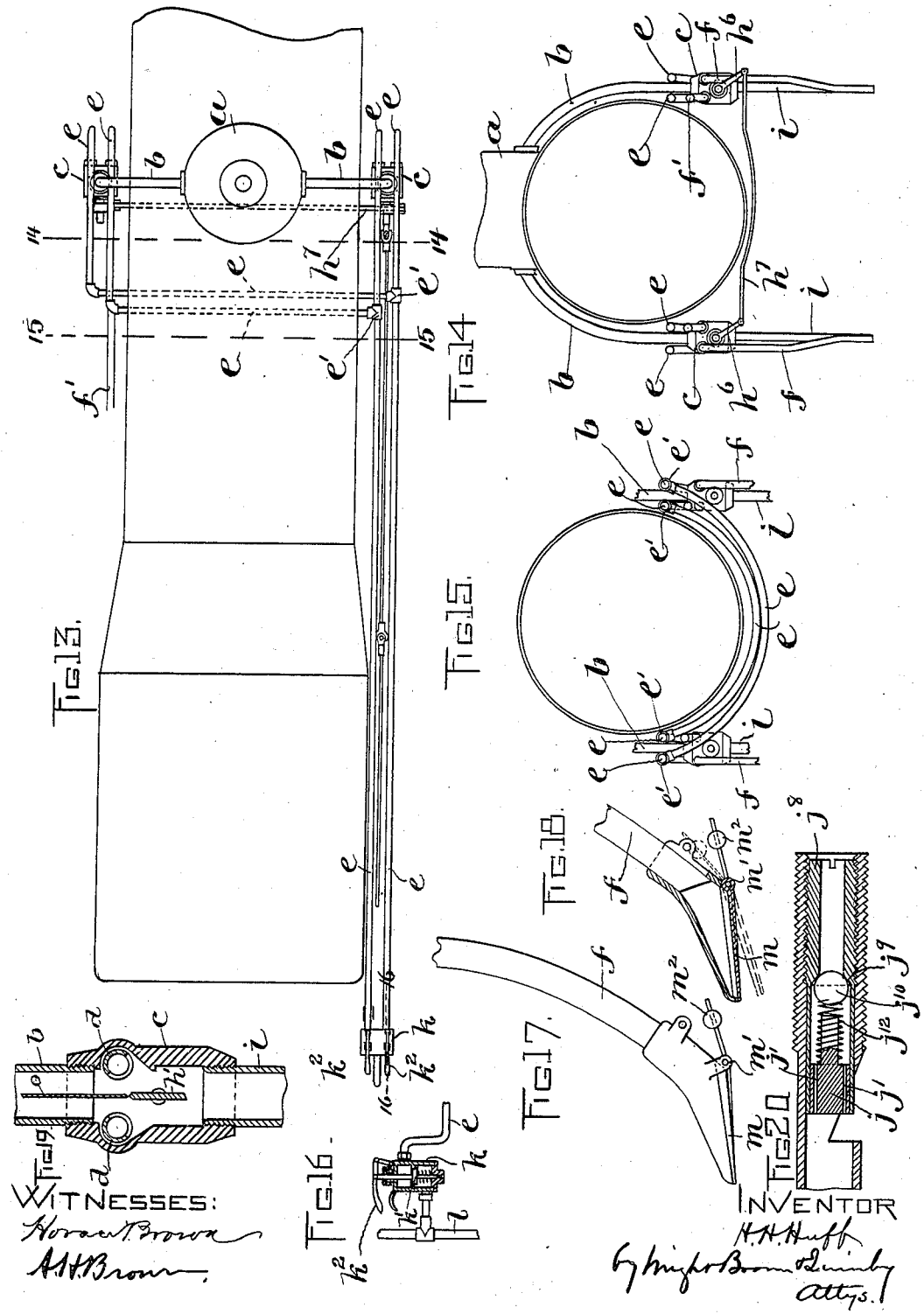

UNITED STATES PATENT OFFICE.

HENRY H. HUFF, OF BOSTON, MASSACHUSETTS, ASSIGNOR OF TWO-THIRDS TO ARTHUR D. CURRAN, OF SAME PLACE, AND SMITH P. BURTON, JR., OF READING, MASSACHUSETTS.

SANDING APPARATUS FOR LOCOMOTIVES.

SPECIFICATION forming part of Letters Patent No. 658,331, dated September 18, 1900.

Application filed June 4, 1900. Serial No. 18,933. (No model.)

*To all whom it may concern:*

Be it known that I, HENRY H. HUFF, of Boston, in the county of Suffolk and State of Massachusetts, have invented certain new and useful Improvements in Track-Sanding Apparatus for Locomotives, of which the following is a specification.

This invention has for its object to provide simple and efficient means whereby sand can be supplied to the rails of a railroad-track by the use of compressed air, and also provide an apparatus in which the sand can be supplied interchangeably by compressed air or by gravity in the usual manner.

The invention consists in the improvements which I will now proceed to describe and claim.

Of the accompanying drawings, Figure 1 represents a side elevation of a locomotive embodying my invention. Fig. 2 represents a side elevation of a portion of the apparatus on a larger scale than that shown in Fig. 1. Fig. 3 represents a section on line 3 3 of Fig. 2 and a plan view of the parts below said line. Fig. 4 represents a section on line 4 4 of Fig. 2. Fig. 5 represents a view similar to Fig. 4, the horizontal blast-pipes being shown in plan instead of in section. Fig. 6 represents a section on line 6 6 of Fig. 3. Fig. 7 represents a section on line 7 7 of Fig. 2 and an elevation of the parts at the right of the said line. Fig. 8 represents a section on line 8 8 of Fig. 2. Fig. 9 represents a section on line 9 9 of Fig. 2. Fig. 10 represents an enlarged sectional view of one of the blast-pipes. Fig. 11 represents a section on line 11 11, Fig. 10. Fig. 12 represents a section on line 12 12 of Fig. 11. Fig. 13 represents a top plan view of a portion of the locomotive. Fig. 14 represents a section on line 14 14 of Fig. 13. Fig. 15 represents a section on line 15 15 of Fig. 13. Fig. 16 represents a section on line 16 16 of Fig. 13. Fig. 17 represents a side elevation of a portion of one of the sand discharge or delivery pipes. Fig. 18 represents a sectional view of the same. Figs. 19 and 20 represent sectional views showing features hereinafter referred to.

The same letters of reference indicate the same parts in all of the figures.

In the drawings, $a$ represents the sand-box of a locomotive, and $b\ b$ sand-discharge pipes communicating therewith and arranged at opposite sides of the engine. Each pipe $b$ communicates at its lower end with a casing $c$, having two blast-pipes $d\ d$ extending horizontally through the casing. With the receiving end of the pipes $d\ d$ are connected air-supply pipes $e\ e$, which conduct compressed air from a suitable source of supply, the air passing through the blast-pipes $d\ d$, which are provided with orifices $d'\ d'$, communicating with the interior of the casing, so that a blast of air through either pipe induces a flow of sand from the casing $c$ through the orifices $d'$ and the delivery-pipes $f\ f'$, connected with the outlet ends of the blast-pipes and extending to points in close proximity to the track-rail $g$, the pipe $f$ being in front of the forward driving-wheel and the pipe $f'$ behind the rear driving-wheel. The air-supply pipes $e\ e$ are controlled independently from the cab, and air can be forced through either of the blast-pipes, causing a supply of sand either in front of the front driving-wheel when the engine is moving forward and behind the rear driving-wheel when the engine is backing.

Each of the casings on the sides of the locomotive is adapted to receive sand from the sand-box, and the blast-pipes, located in each of said casings, are in practice embedded in the sand in said casing. The sand therefore flows readily into the blast-pipes through the orifices thereof and is ejected at the delivery end by the air supplied at the other end without the employment of an ejector-nozzle to effect such delivery. This arrangement also possesses the advantage of enabling the invention to be applied to a locomotive having the ordinary sand-box without alteration of the latter in any way, the casings and the pipe connections being readily applied to engines as now constructed.

In the casing, below the blast-pipes $d\ d$, is a valve or gate $h$, which retains the body of sand in the casing in position to be drawn through the orifices $d'$ of the blast-pipe by the air-blast. From the lower portion of the casing $c$ the outlet-pipe $i$ extends to a point over the track-rail and near the front driving-wheel, said pipe $i$ being used to deliver sand by gravitation when the air-blast is not used. The valve $h$ is provided with trunnions $h'$ $h'$, Fig. 9, one of which is connected by the swivel-joint $h^2$ and jointed rods $h^3$ $h^4$ with the cab of the locomotive, the arrangement being such that the engineer can open or close the valve $h$ by manipulating a handle $h^5$ on the rod $h^4$. The valve $h$ in the casing at one side of the locomotive is connected with the valve in the casing at the opposite side of the locomotive by means of arms $h^6$ $h^6$, attached to the trunnions of the valves, and a rod $h^7$, connecting the arms $h^6$, as shown in Fig. 14, so that the two valves are opened and closed simultaneously.

Each of the blast-pipes $d$ is provided with a device for varying the size of the sand-orifices $d'$ and for distributing the air-blast, said device comprising a plug $j$, which closely fits the interior of the blast-pipe and has a series of longitudinal orifices $j'$, which subdivide the air-blast and deliver it in numerous small jets in close proximity to the internal surfaces of the blast-pipe $d$ at one end of the orifice $d'$. Said plug is provided with an extension $j^2$, which is externally screw-threaded and engaged with an internal thread in one end of the blast-pipe and is provided with a square socket $j^3$ to receive a tool for turning the plug $j$ and its extension $j^2$, and thereby adjusting the plug to cause it to cover any desired part of the orifice $d'$, and thus vary the quantity of sand that will be drawn into the blast-pipe. The extension $j^2$ has an orifice $j^4$, through which the air-blast enters two spaces or chambers $j^5$ $j^5$ on opposite sides of the shank $j^6$, which connects the extension $j^2$ with the plug $j$. The air-blast or supply-pipe $e$ passes through the passage $j^4$ and into the chambers $j^5$ and through the orifices $j'$.

The air-supply pipes $e$ $e$ may receive air from the source of supply which furnishes air to operate the brakes or from an independent source. In Fig. 16 I show one of the pipes $e$ connected to a valve-casing $k$, having a valve $k'$, adapted to be depressed by a lever $k^2$, but the portion of the casing $k$ below the valve is connected with a pipe $l$, which communicates with the source of air-supply, so that when the valve $k$ is opened the air passes from the pipe $l$ to the pipe $e$ through the casing $k$.

The delivery-pipes $f$ $f'$ are shown in Figs. 17 and 18 as provided with a weighted self-closing valve $m$, pivoted at $m'$ and normally held closed by means of the weight $m^2$, which is adjusted so that the valve will yield to the weight of sand falling upon it through the pipe $f$. When the sand ceases to flow, the valve $m$ is closed by the weight and prevents the entrance of moisture into the pipe $f$.

The air-supply pipes $e$ $e$ are preferably branched at $e'$ $e'$, Fig. 13, each pipe having two divisions, one of which supplies air to the casing $c$ at one side of the engine, while the other supplies air to the casing at the opposite side of the engine.

In case damp sand should accumulate and be frozen in the casing $c$ and either of the delivery-pipes $f$, $f'$, or $i$ it may be removed by heating the air-blast and directing it into either of the said pipes by closing the others. The air may be heated by storing it by means of a suitable compressor in a reservoir so located as to be heated by a heated part of the engine.

In Fig. 19 I show a partition $o$ in the lower portion of the pipe $b$ and in the upper portion of the casing $c$, said partition being between the blast-pipes $d$ $d$. The object of the said partition is to equally divide the sand between the blast-pipes and prevent it from packing in the casing between the pipes.

In Fig. 20 I show the plug $j$ affixed to an externally-threaded tube $j^8$, which is engaged with an internal thread in the blast-pipe and is provided with a seat $j^9$. $j^{10}$ is a ball which is pressed yieldingly by a spring $j^{12}$ against the seat $j^9$. The ball $j^{10}$ acts to distribute the blast uniformly between the orifices $j'$. The shank $j^6$ (shown in Figs. 4, 10, and 11) also acts as a blast-distributer, causing the blast to uniformly enter the chambers $j^5$ and orifices $j'$.

I claim—

1. A track-sanding apparatus comprising a sand-box, a casing connected with said box, and adapted to contain sand, a blast-pipe having a sand-receiving orifice and located within the casing and adapted to be embedded in the sand in said casing, a supply-pipe connected with one end of the blast-pipe, and a sand-delivery pipe connected with the other end of the blast-pipe.

2. A track-sanding apparatus comprising a sand-box, a casing connected with a sand-box, and adapted to contain sand, two blast-pipes located in the casing and each having a sand-receiving orifice within the casing, independently-controlled air-supply pipes connected with the receiving ends of the blast-pipes, and independent sand-delivery pipes connected to the delivery ends of the blast-pipes, one of said delivery-pipes being arranged to deliver sand in front of the driving-wheels, and the other behind the driving-wheels.

3. A track-sanding apparatus comprising a sand-holding casing, a blast-pipe having a sand-receiving orifice within the casing, an air-supply pipe connected with the receiving end of the blast-pipe, a sand-delivery pipe connected with the delivering end of the blast-pipe, and an air-conducting plug or valve adjustable in the blast-pipe and adapted to vary the operative size of the sand-receiving opening therein.

4. A track-sanding apparatus comprising a sand-holding casing, a blast-pipe having a sand-receiving orifice within the casing, an air-supply pipe connected with the receiving end of the blast-pipe, a sand-delivery pipe connected with the delivering end of the blast-pipe, and an air-conducting plug or valve adjustable in the blast-pipe and adapted to vary the operative size of the sand-receiving opening therein, said valve having air-distributing orifices.

5. A track-sanding apparatus comprising a casing connected with a sand-box, and adapted to contain sand, a blast-pipe having a sand-receiving orifice within the casing, and a supply-pipe connected with one end of the blast-pipe, a sand-delivery pipe connected with the other end of the blast-pipe, a sand-delivery pipe extending from the casing below the blast-pipe, and a valve in the casing between the blast-pipe and the last-mentioned delivery-pipe.

6. A track-sanding apparatus comprising a casing connected with a sand-box, and adapted to contain sand, a blast-pipe having a sand-receiving orifice within the casing, and a supply-pipe connected with one end of the blast-pipe, a sand-delivery pipe connected with the other end of the blast-pipe, a sand-delivery pipe extending from the casing below the blast-pipe, a valve in the casing between the blast-pipe and the last-mentioned delivery-pipe, and means for operating said valve, said means including a handle in the cab and connections between said handle and the valve.

7. A track-sanding apparatus comprising two casings at opposite sides of a locomotive, connections between said casings and the sand-box, blast-pipes having sand-receiving orifices within the casings, means for supplying compressed air to the blast-pipes, sand-delivery pipes connected with the blast-pipes, said delivery-pipes extending from the lower portions of the casings, valves in the casings between the blast-pipes and the last-mentioned delivery-pipes, an operating-handle in the cab and connections between said handle and one of the valves, and connections between the two valves extending across the engine, whereby the valves are simultaneously operated.

8. A track-sanding apparatus comprising a sand-box, two casings at opposite sides of a locomotive, connections between said casings and the sand-box, blast-pipes located in said casing and having sand-receiving orifices intermediate the ends thereof and within the casings, air-supply pipes connecting a source of compressed-air supply with the receiving end of the blast-pipes, means controlled by an attendant in the cab for supplying and shutting off the compressed air, and sand-delivery pipes extending from the blast-pipes.

9. In a track-sanding apparatus, a sand-delivery pipe having a yieldingly-closed valve at its delivering end, adapted to be opened by sand in the pipe.

10. In a track-sanding apparatus a casing having a sand-supply pipe, two blast-pipes and a partition between the blast-pipes.

11. In a track-sanding apparatus a blast-pipe having a sand-inlet, a plug at one side of the inlet having a series of air-conducting orifices and means for distributing air supplied to said orifices.

12. In a track-sanding apparatus a blast-pipe having a sand-inlet, a plug at one side of the inlet having a series of air-conducting orifices, and a spring-pressed air-distributer yieldingly held against a seat in the conduit which supplies air to said orifices.

In testimony whereof I have affixed my signature in presence of two witnesses.

HENRY H. HUFF.

Witnesses:
HORACE BROWN,
H. L. ROBBINS.